United States Patent [19]
Harrod

[11] Patent Number: 5,671,934
[45] Date of Patent: Sep. 30, 1997

[54] ADJUSTABLE AXLE MOUNTING ASSEMBLY FOR CHILDREN'S RIDE-ON VEHICLES

[75] Inventor: Lawrence Roger Harrod, Ft. Wayne, Ind.

[73] Assignee: Mattel, Inc., El Segundo, Calif.

[21] Appl. No.: 520,772

[22] Filed: Aug. 30, 1995

[51] Int. Cl.⁶ ........................................ B62D 21/00
[52] U.S. Cl. ........................................ 280/87.05
[58] Field of Search ................... 280/638, 42, 43, 280/87.01, 87.042, 87.05, 11.27, 43.18, 43.19; 446/465, 466, 467

[56] References Cited

U.S. PATENT DOCUMENTS

| | | | |
|---|---|---|---|
| 1,279,555 | 9/1918 | Kramlich | 280/87.05 |
| 1,310,218 | 7/1919 | Silver | 280/87.05 |
| 1,370,604 | 3/1921 | McLaren | 280/87.01 |
| 1,378,023 | 5/1921 | Hachmann | 280/87.05 |
| 1,700,459 | 1/1929 | White | 280/87.05 |
| 2,190,091 | 2/1940 | Wolfe | 301/132 |
| 2,275,302 | 3/1942 | Magnuson | 280/839 |
| 2,532,076 | 11/1950 | Raney et al. | 280/43 |
| 2,558,311 | 6/1951 | Morrow | 267/275 |
| 2,811,368 | 10/1957 | Clausen | 280/43 |
| 2,882,063 | 4/1959 | Strasel | 280/43 |
| 2,894,761 | 7/1959 | Knarzer | 280/43 |
| 3,843,148 | 10/1974 | Wright | 280/718 |
| 4,850,929 | 7/1989 | Genevey | 280/43 |
| 4,861,311 | 8/1989 | Alskog | 446/469 |
| 5,048,848 | 9/1991 | Olson et al. | 280/11.22 |

FOREIGN PATENT DOCUMENTS 90616   1/1968   France ........................ 446/469

*Primary Examiner*—Richard M. Camby
*Assistant Examiner*—Frank Vanaman
*Attorney, Agent, or Firm*—Kolisch, Hartwell, Dickinson, McCormack, & Heuser

[57] ABSTRACT

A wheel-mounting assembly for use in a children's ride-on vehicle having a frame includes a cross member extending transversely of the frame providing a mount for two of the vehicle's opposed wheels, and frame-formed support structure in the form of two downwardly extending plates defining a slot for receiving the cross member and providing a mount on which the cross member is fastened. The plates have plural spaced apertures therein and the cross member has apertures which align with the apertures in the plates. Fastening mechanisms in the form of a bolt passing though the aligned apertures and secured in place by a nut, fix or mount the cross member to the plates. Pairs of vertically-spaced apertures in the wall structure enable the cross member to be selectively vertically positioned relative to the plates for accommodating different-sized wheels.

15 Claims, 1 Drawing Sheet

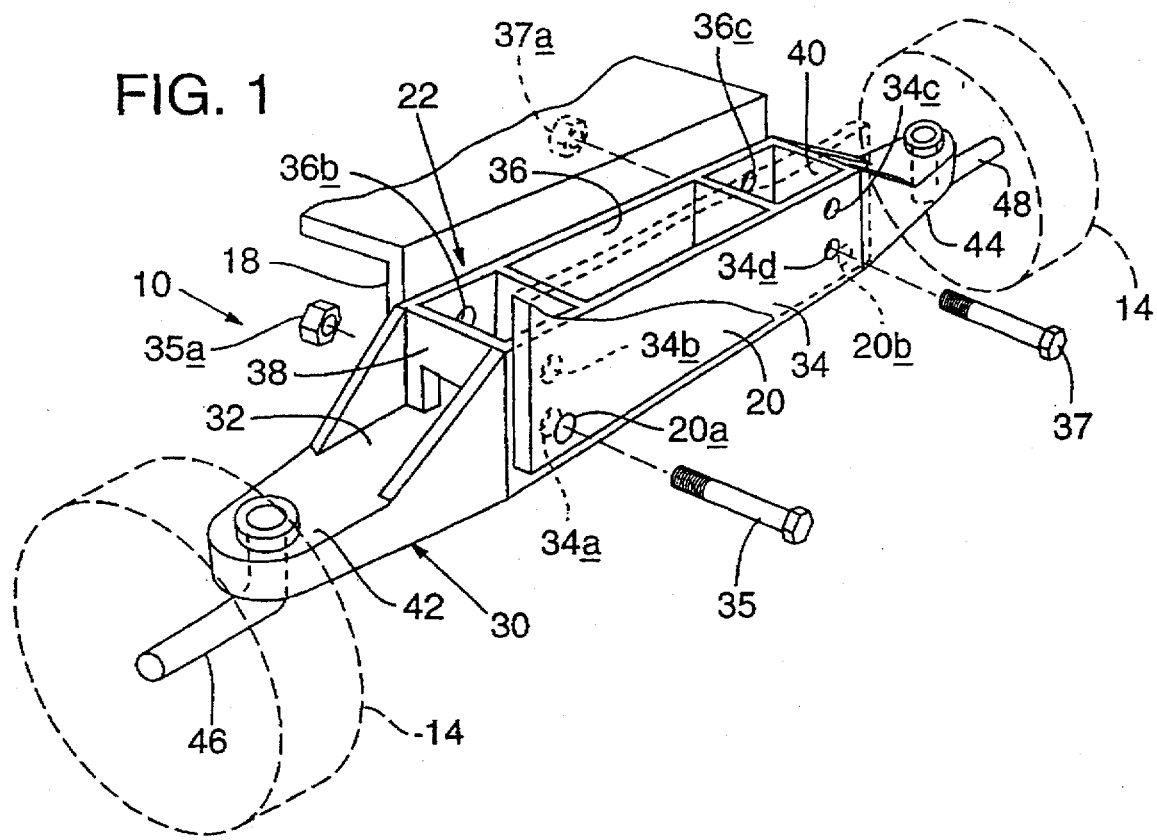
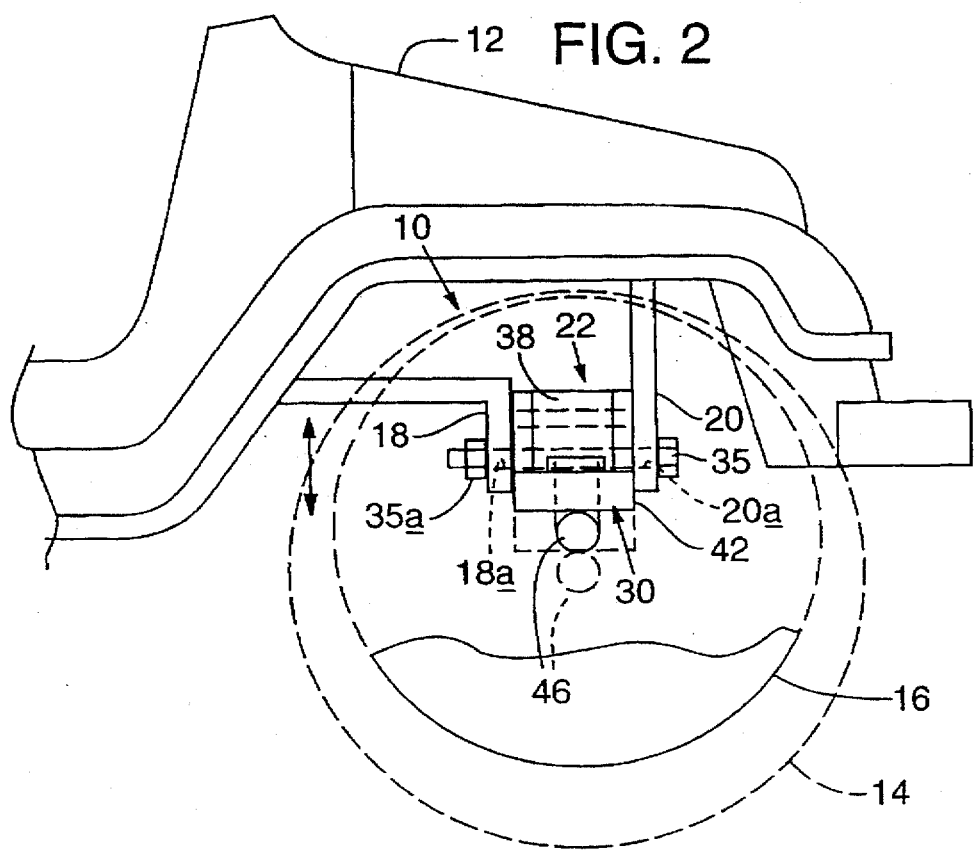

ADJUSTABLE AXLE MOUNTING ASSEMBLY FOR CHILDREN'S RIDE-ON VEHICLES

BACKGROUND AND SUMMARY OF THE INVENTION

The present invention relates to children's ride-on vehicles, and more particularly to a vertically-adjustable wheel-mounting assembly for use on such a vehicle, for accommodating different-sized wheels.

Children's ride-on vehicles come in many different shapes and sizes because children come in many different shapes and sizes. In addition to varying in shape and size, the vehicles often vary in theme. For example, Mattel, Inc. designs and manufactures a number of these ride-on vehicles having varied shapes, sizes, and themes. For example, vehicles for children between the ages of 3–7 years who weigh up to 130 lbs include the Jeep® Sand Blasters®; vehicles designed for children between the ages of 3–7 years who weigh up to 65 lbs. include the Suzuki® Quad Racer® 900; and, vehicles designed for children between the ages of ½–6 years who weigh up to 50 lbs. include the Lil Sand Blaster® to name just a few.

While each of these vehicles is unique insofar as size, shape and theme are concerned, there are similarities among some designs which enable the manufacture of a single component or components which may be used interchangeably among the vehicles. For example, the electrical system for powering some of the vehicles may be the same, and may be mounted in the same way in certain vehicles. Thus, the manufacturer need only assemble one type of electrical system which may then be incorporated into different vehicles.

A significant problem with assembling the various children's ride-on vehicles stems from the size difference among them. More specifically, vehicles designed for smaller children must naturally be smaller than those designed for larger children. Accordingly, one of the features which must be adjusted between and among these different-sized vehicles is wheel size. Naturally, smaller vehicles use smaller wheels than their larger counterparts. As a result, the undercarriage which provides a mount for these wheels varies between and among the vehicles which increases the cost of the design and the time spent assembling the vehicle. Thus, a significant need exists for standardizing the undercarriages of different-sized children's ride-on vehicles so that manufacture and assembly of the vehicles may be made more efficient and the cost thereof reduced.

With the above problems in mind, it is a general object of the present invention to provide a novel wheel-mounting assembly for accommodating different-sized vehicle wheels which may be used in more than one type of ride-on vehicle.

It is another object of the present invention to provide an assembly that achieves the above results and yet is economical to manufacture by virtue of having relatively few parts, featuring components readily moldable from plastic, and not requiring precisely fitting parts.

Yet another object of the invention is to provide a structure that is rugged enough to tolerate the abuses expected in the operating environment.

The invention achieves these and other objects in the form of a wheel-mounting assembly on the frame of a children's ride-on vehicle which includes a cross member extending transversely of the frame and providing a mount for two of the vehicle's opposed wheels, and frame-formed support structure which includes two downwardly extending plates defining a slot for receiving the cross member and providing a mount on which the cross member is fastened. The plates have plural spaced axially-aligned apertures therein and the cross member includes pairs of vertically-spaced apertures for aligning with the apertures in the plates when the cross member is inserted in the slot. Fastening mechanisms in the form of a bolt which passes though the aligned apertures in the plates and cross member and is secured in place by a nut, fix or mount the cross member to the plates. The vertical spacing of the cross members paired apertures enables the cross member to be selectively vertically positioned relative to the plates and fastened at different heights for accommodating different-sized wheels.

These and other objects and advantages of the invention will become more fully apparent as the description which follows is read in conjunction with the drawings.

BRIEF DESCRIPTION OF THE DRAWINGS

FIG. 1 is a perspective view of the wheel-mounting assembly of the present invention.

FIG. 2 is a side elevation of the wheel-mounting assembly showing it adjustably mounted on a ride-on vehicle's frame.

DETAILED DESCRIPTION OF THE PREFERRED EMBODIMENT

As shown in FIGS. 1 and 2, a wheel-mounting assembly according to the present invention is generally indicated at 10, where it may be seen on the underside of a vehicle frame 12 (FIG. 2) of a children's ride-on vehicle. The assembly includes frame-formed mounting or support structure joined to the frame in the form of two generally parallel, downwardly-extending, spaced-apart plates 18, 20 defining a slot 22, and a cross member generally indicated at 30, which is mounted on the structure in slot 22 as shown, for selective vertical positioning described in more detail below. Preferably, both plates and cross member are constructed of molded plastic which is both durable and inexpensive to manufacture.

As shown in FIG. 2, plate 18 includes an aperture 18a which is axially aligned with an aperture 20a in plate 20. FIG. 1 shows an aperture 20b in phantom, transversely spaced from aperture 20a. Aperture 20b is similarly axially aligned with an aperture in plate 18 which is transversely spaced from aperture 18a (FIG. 2), and although this aperture is not specifically shown, it will be understood, for purposes of explanation and symmetry, to be referred to as aperture 18b.

FIG. 1 shows that cross member 30 extends transversely of the vehicle's frame and is formed of wall structure which may be seen to include a base 32 and plural walls 34, 36, 38, and 40, all of which are joined to the base and extend upwardly therefrom to define a box-like rectangular structure. Opposed walls 34, 36 form the long sides of the structure and extend transversely of the frame in a generally parallel manner, and opposed walls 38, 40 form the short sides of the structure and extend generally parallel to the longitudinal axis (not specifically shown) of the vehicle. Walls 34, 36 and walls 38, 40 may also be described as the cross member's side walls and end walls, respectively.

Wall 34 includes plural, spaced apertures 34a through 34d as shown. Apertures 34a, 34b define a pair of vertically-spaced apertures, and apertures 34c, 34d define another pair of vertically-spaced apertures. It will be appreciated that wall 36 includes similarly disposed plural apertures (only apertures 36b, 36c are shown in FIG. 1) and that all of the apertures in wall 36 are axially aligned with corresponding apertures in wall spaced apertures that is vertically aligned with the lower pair. 34. The apertures in walls 34, 36 could also be described as a lower pair of horizontally spaced apertures and an upper pair of horizontally spaced apertures that is vertically aligned with the lower pair. The vertical spacing of the above-described aperture pairs enables cross member 30 to be vertically positioned and hence adjustably mounted to the plates within slot 22, described in more detail below.

FIG. 1 shows that cross member 30 includes two opposed extensions 42, 44 adjacent the wall structure just described, which provide a mount for two of the vehicles opposed wheels 14, 14 through any suitable spindle mounts 46, 48 respectively.

Fastening mechanisms in the form of plural bolts 35, 37 are provided and are insertible through the aligned apertures in plates 18, 20, and walls 34, 36 and receive standard nuts 35a, 37a respectively, for removably fixing or mounting cross member 30 in slot 22 between plates 18, 20. Although the cross member is shown as mounted using conventional nut and bolt combinations, it will be appreciated that any suitable fastening mechanism will do.

Cross member 30 is selectively, vertically positionable within slot 22 for accommodating opposed vehicle wheels having different sizes. More specifically, the plural vertically-spaced aperture pairs 34a, 34b, and 34c, 34d in wall 34, and the similarly vertically-spaced aperture pairs 36a, 36b, and 36c, 36d in wall 36, allow cross member 30 to be positioned relative to plates 18, 20, in a first or second alternative position, depending on the diameter of wheel to be used.

FIG. 2 shows the alternative positions, the first position being shown in solid lines, and the second position being shown in dashed lines. The first position corresponds to a mounting configuration in which smaller diameter wheels (one of which is shown at 16) are mounted on the spindles described above. The second position corresponds to a mounting configuration in which larger diameter wheels (one of which is shown at 14) are mounted on the spindles. Transitioning between the first and second positions is done by removing nuts 35a, 37a from corresponding bolts 35, 37, withdrawing the bolts from the apertures in plates 18, 20 and cross member 30, and lowering the cross member so that axially-aligned apertures 34b, 36b in walls 34, 36 respectively, and 34c, 36c in walls 34, 36 respectively, are aligned with apertures 18a, 20a and 18b, 20b in plates 18, 20 respectively. Reinserting bolts 35, 37 through the aligned apertures in the plates and walls and reattaching nuts 35a, 37a fixes the cross member for receiving wheels having larger diameters.

As mentioned above, although children's riding vehicles come in many different shapes and sizes, common design aspects, (such as using two opposed wheels), may be exploited and standardized for cost savings in design and manufacturing. Such cost savings are inherent in the design of the wheel-mounting assembly described above, because it may be employed in different-sized vehicles for accommodating different-sized wheels. It will be appreciated that the wheel-mounting assembly of the present invention may be used on either the front or back (or both) of a riding vehicle, and that the riding vehicle may or may not be motorized. Moreover, it will be understood that any number of vertically-spaced apertures may be provided for accommodating more than the two different-sized wheels discussed above.

While the present invention has been shown and described with reference to the foregoing preferred embodiment, it is to be understood by those of skill in the art that other changes in form and detail may be made therein without departing from the spirit and scope of the invention as defined in the appended claims.

It is claimed and desired to secure by Letters Patent:

1. A wheel-mounting assembly for use in a children's ride-on vehicle having a frame, the assembly comprising:
   a cross member extending transversely of the frame providing a mount for two wheels, the cross member including a base and wall structure that includes a plurality of spaced-apart walls extending from the base to form a box-shaped rectangular structure, wherein the plurality of spaced-apart walls include a forward wall and a rearward wall; and
   a frame-formed support structure for receiving the cross member and providing a mount on which the cross member is fastened, the structure further allowing the cross member to be selectively vertically positioned and fastened relative thereto for accommodating different-sized wheels, wherein the structure includes a pair of downwardly extending plates that define a slot for receiving the cross member and extend transversely of the frame to engage the forward and the rearward walls of the cross member and thereby provide a mount for the cross member.

2. The assembly of claim 1 further comprising fastening mechanisms for removably mounting the cross member to the plates.

3. The assembly of claim 2, wherein the forward and the rearward walls are generally opposed to each other and have plural spaced apertures therein, and wherein the plates include plural spaced apertures for aligning with the walls' apertures when the wall structure is inserted into the slot, and timber wherein the fastening mechanisms are insertible through the aligned apertures in the plates and the forward and the rearward walls for mounting the cross member to the plates.

4. The assembly of claim 3, wherein the apertures in the opposed forward and rearward walls include at least two vertically-spaced apertures for enabling the cross member to be selectively vertically positioned relative to the plates.

5. The assembly of claim 3, wherein the fastening mechanisms include at least one nut and bolt.

6. The assembly of claim 1, wherein the plates and the cross member are constructed of molded plastic.

7. A wheel-mounting assembly for use in a children's ride-on vehicle having a frame, the assembly comprising:
   an elongate cross member extending transversely of the frame and including a base, plural spaced-apart end walls and plural spaced-apart, elongate side walls, wherein the end walls and the side walls extend upwardly from the base to form a box-shaped rectangular structure, each side wall includes a lower pair of horizontally spaced apertures and an upper pair of horizontally spaced apertures that is vertically aligned with the lower pair of apertures, and the pairs of apertures are in substantially the same position on both walls;
   a support structure having two spaced, generally parallel frame-formed plates that collectively define a slot into which the cross member is received, the plates extending downwardly from and transversely of the frame and having corresponding pairs of horizontally spaced apertures configured to align selectively with either the lower or the upper pair of apertures in the side walls; and a plurality of fastening mechanisms for selectively fastening the cross member within the slot formed by the first and second plates in a position defined by aligning the apertures in the plates with either the lower or the upper pairs of apertures in the side walls of the cross member.

8. The assembly of claim 7, wherein the cross member further includes two opposed extensions, each adjacent one of the end walls and extending generally away from and perpendicular to that end wall.

9. The assembly of claim 8, wherein each extension includes a spindle mount for receiving a wheel.

10. The assembly of claim 9, wherein the cross member includes at least one rib extending between the side walls.

11. The assembly of claim 7, wherein the plates and the cross member are constructed of molded plastic.

12. A wheel-mounting assembly for use in a children's ride-on vehicle having a time, the assembly comprising:

a cross member extending transversely of the frame providing a mount for two wheels, the cross member including a base and a plurality of spaced-apart walls extending from the base to form a box-shaped rectangular structure, wherein the plurality of spaced-apart walls include two generally parallel, opposed walls extending transversely of the flame and having plural spaced apertures therein;

a frame-formed support structure for receiving the cross member and allowing the cross member to be selectively vertically positioned and fastened relative thereto for accommodating different-sized wheels, the structure including a pair of downwardly extending plates that extend transversely of the frame to engage the pair of opposed walls on the cross member and to define a slot into which the walls are received, thereby provide a mount for the cross member, wherein the plates include plural spaced apertures for aligning with the wall's apertures when the walls are inserted into the slot; and fastening mechanisms for removably mounting the cross member to the plates, wherein the fastening mechanisms are insertible through the aligned apertures in the plates and walls for mounting the cross member to the plates.

13. The assembly of claim 12, wherein the apertures in the opposed walls include at least two vertically-spaced apertures for enabling the cross member to be selectively vertically positioned relative to the plates.

14. The assembly of claim 12, wherein the fastening mechanisms include at least one nut and bolt.

15. The assembly of claim 12, wherein the cross member and the plates are constructed of molded plastic.

* * * * *